United States Patent
Alexander

(10) Patent No.: US 8,983,274 B2
(45) Date of Patent: Mar. 17, 2015

(54) SYSTEMS AND METHODS FOR REVOLVING RECORDING CONFLICTS

(75) Inventor: Michael Alexander, Denver, CO (US)

(73) Assignee: Echostar Technologies L.L.C., Englewood, CO (US)

( * ) Notice: Subject to any disclaimer, the term of this patent is extended or adjusted under 35 U.S.C. 154(b) by 166 days.

(21) Appl. No.: 13/112,789

(22) Filed: May 20, 2011

(65) Prior Publication Data

US 2012/0294591 A1    Nov. 22, 2012

(51) Int. Cl.
| | |
|---|---|
| *H04N 5/782* | (2006.01) |
| *H04N 21/472* | (2011.01) |
| *H04N 21/433* | (2011.01) |
| *H04N 21/45* | (2011.01) |
| *H04N 21/458* | (2011.01) |
| *H04N 21/475* | (2011.01) |
| *H04N 21/488* | (2011.01) |
| *H04N 5/445* | (2011.01) |

(52) U.S. Cl.
CPC ......... *H04N 21/47214* (2013.01); *H04N 5/782* (2013.01); *H04N 21/4334* (2013.01); *H04N 21/4532* (2013.01); *H04N 21/4583* (2013.01); *H04N 21/4755* (2013.01); *H04N 21/4882* (2013.01); *H04N 2005/44547* (2013.01)
USPC .......................................................... 386/298

(58) Field of Classification Search
USPC ...................... 386/291, 292, 293, 298; 725/58
See application file for complete search history.

(56) References Cited

U.S. PATENT DOCUMENTS

| | | | |
|---|---|---|---|
| 6,760,538 B1 * | 7/2004 | Bumgardner et al. | 386/291 |
| 7,088,910 B2 * | 8/2006 | Potrebic et al. | 386/291 |
| 7,593,621 B2 * | 9/2009 | Ju | 386/291 |
| 7,614,076 B2 * | 11/2009 | Ono et al. | 725/142 |
| 7,882,520 B2 * | 2/2011 | Beach et al. | 725/37 |
| 8,141,123 B2 * | 3/2012 | Del Sordo et al. | 725/142 |
| 8,457,475 B2 * | 6/2013 | Ellis et al. | 386/291 |
| 2010/0080530 A1 * | 4/2010 | Clayton et al. | 386/83 |
| 2012/0294591 A1 * | 11/2012 | Alexander | 386/292 |

* cited by examiner

*Primary Examiner* — David Harvey
(74) *Attorney, Agent, or Firm* — Seed IP Law Group PLLC

(57) ABSTRACT

A method for recording multimedia content. The method includes providing instructions to record a plurality of segments of multimedia content, each of the plurality of segments having a recording start time and a recording end time associated therewith. The method further includes providing instructions regarding recording settings for one or more first segments of multimedia content to be recorded. The method also includes comparing modified start time and/or modified end times with the recording start times and/or the recording end times associated with the plurality of segments of multimedia content and determining, based at least in part on the comparison, whether to record the one or more first segments with the modified start time and/or the modified end time.

14 Claims, 2 Drawing Sheets

SYSTEMS AND METHODS FOR REVOLVING RECORDING CONFLICTS

FIELD OF THE INVENTION

The present disclosure relates to systems and methods for recording multimedia content and more particularly to systems and method for conditionally modifying recording settings associated with multimedia content to be recorded.

SUMMARY

In one embodiment, the present disclosure relates to a method for recording multimedia content. The method includes providing, utilizing a processing unit, instructions to record a plurality of segments of multimedia content. Each of the plurality of segments have a recording start time and a recording end time associated therewith. The method further includes providing, utilizing a processing unit, instructions to record one or more first segments of multimedia content. The method further includes providing, utilizing a processing unit, instructions regarding recording settings for the one or more first segment of multimedia content to be recorded. The one or more first segments of multimedia content are associated with a scheduled start time and a scheduled end time. The instructions comprise either or both of: (i) a modified start time that is earlier than the scheduled start time, and (ii) a modified end time that is later than the scheduled end time. The method further includes comparing, utilizing a processing unit, the modified start time and/or modified end time with the recording start times and/or the recording end times associated with the plurality of segments of multimedia content. The method further includes determining for each of the one or more first segments of multimedia content, based at least in part on the comparison, whether to record such first segment with the modified start time and/or the modified end time.

In one embodiment, the present disclosure relates to a system for recording multimedia content. The system includes a a processing unit and a recorder operatively coupled to the processing unit. The processing unit is provided with computer implemented instructions to receive instructions regarding recording settings for one or more first segments of multimedia content to be recorded. The one or more first segments of multimedia content are associated with a scheduled start time and a scheduled end time. The instructions comprise either or both of: (i) a modified start time for recording the one or more first segments of multimedia content that is earlier than the scheduled start time, and (ii) a modified end time for the recording the one or more first segments of multimedia content that is later than the scheduled end time. The processing unit is provided with further computer implemented instructions to compare the modified start time and/or modified end time with start times and/or end times of other segments of multimedia content to be recorded that are stored to a database accessible to the processing unit and determine, based at least in part on the instructions and the comparison, whether to record the one or more first segments with the modified start time and/or modified end time.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

The description that follows includes sample systems, methods, and computer program products that embody various elements of the present disclosure. However, it should be understood that the described disclosure may be practiced in a variety of forms in addition to those described herein.

Current multimedia recording devices, such as digital video recorders (DVRs), often employ electronic program guides that users can access to specify programs to record, such as television series. Typically, a specified program is set for broadcast with a scheduled start time and a scheduled end time on one or more days. When a timer engine in the DVR indicates that the scheduled start time for a specified program has occurred, the DVR automatically records the program until the scheduled end time. While recording programs according to the scheduled start and end times may record a large portion of the program, often times, it omits a beginning and/or ending portion of the program. For example, a timer engine in the DVR may not be accurate, or may not be synchronized with a clock utilized by the content provider. In addition, the program might start early or late, or run past the scheduled end time. For example, a sports program shown before the specified program might occasionally delay the program's actual start time by a variable amount, which may result in the DVR failing to record the end of the specified program. Because of the uncertainty with respect to the actual start and stop times of programs scheduled for recording, it may be desirable to program the DVR to begin recording a program a selected period prior to the scheduled start time and/or stop recording a program a selected period after the scheduled end time.

However, modifying the recording start and stop times in this manner presents additional problems, particularly with respect to recurring programs such as a television series. Often times, DVRs are able to record only a limited number of programming channels at a given time. Thus, if the recording time for a program is extended (either by starting early or ending late), and such program is scheduled to occur immediately before or immediately after previously scheduled recordings, such extension may cause an otherwise avoidable conflict with the previously scheduled recordings. That is, such extension may result in the number of program channels scheduled to be recorded at a given time exceeding the number of programs channels the DVR can record simultaneously.

For a recurring program such as a television series, the foregoing conflict may occur only with respect to a limited number of the episodes in the series. However, under current recording systems, a user's only options are to extend the recording for all of the episodes, or none of the episodes. Accordingly, systems and methods for flexibly modifying the start and/or stop recording times of programs may be desirable.

Figure 1:
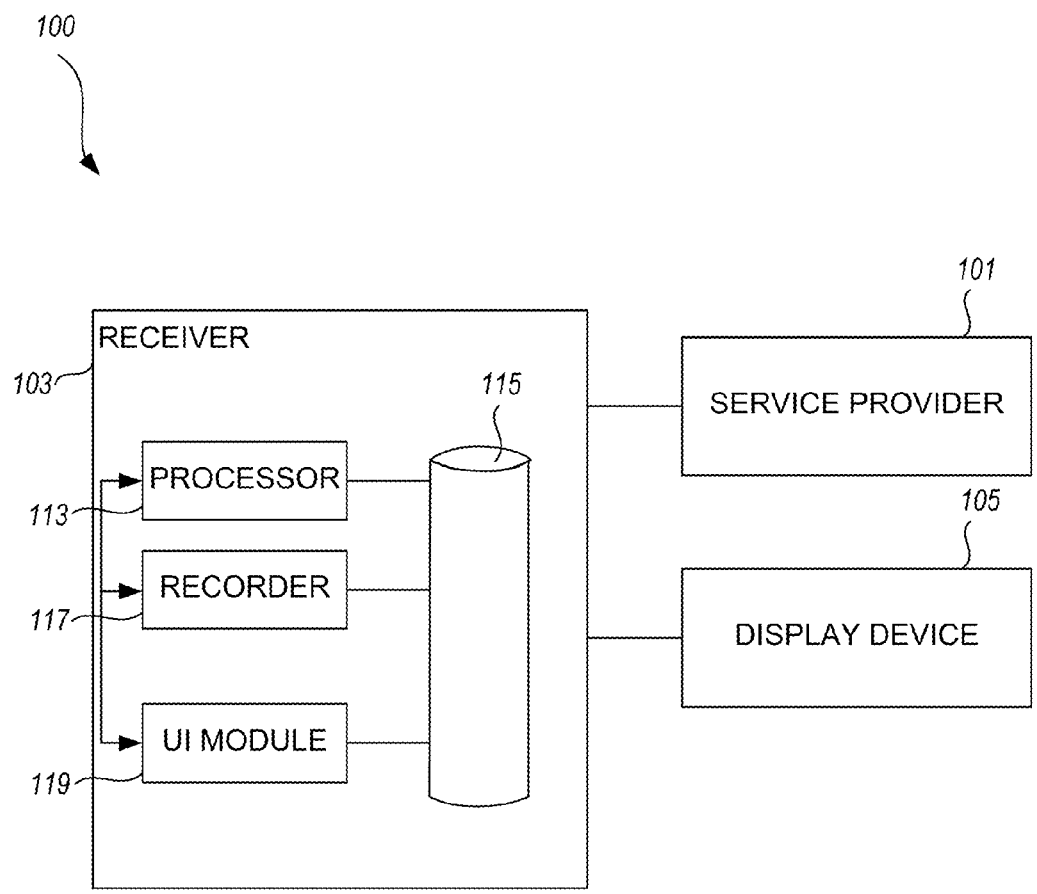
FIG. 1 is a block diagram illustrating a system for recording multimedia content in accordance with some embodiments of the present disclosure.

FIG. 1 is a schematic illustration of a general operating environment 100 showing components and features of embodiments discussed herein. Generally, embodiments discussed herein are directed to receiving and processing user instructions regarding the recording of multimedia content. In some embodiments, the operating environment 100 may include a content provider 101, a content receiver 103, and a display device 105.

In illustrative embodiments, the content provider 101 may be any content provider that provides a multimedia content transmission to the content receiver 103 such as, without limitation, a satellite television service, a direct television service or cable television service, or a streaming video delivered across a network such as the Internet.

In some embodiments, in addition to multimedia content, the content provider 101 may provide information regarding multimedia content that is available, presently or in the future, for transmission to the content receiver 103 ("content data"). For example, in embodiments in which the multimedia content includes television programming, the content data may include any or all of: program identifying information, channel identifying information, date/time information (e.g. scheduled start and end times), and/or other information relating to the programs. In some embodiments, at least a portion of the content data may be provided in the form of an electronic program guide that may be visually displayed to users, such as in a grid format, which contains at least program titles and starting and ending times of programs carried by programming channels that are available from the content provider 101. While the present disclosure is described with respect to embodiments in which the content data is provided by the service provider 101, it is to be appreciated that, additionally or alternatively, the content data may be provided by a third party provider that is in communication with the content receiver 103 over a network, such as the Internet.

The content receiver 103 may be any device capable of receiving multimedia content included in a broadcast or other content service transmission from a content provider. For example, the content receiver 103 may be configured to communicate with or receive signals from the content provider 101, which may broadcast, transmit, or otherwise deliver multimedia content and/or content data to the content receiver 103. The content receiver 103 may be in the form of, for example, a set-top box, a digital video recorder, a cable receiver, a general purpose computing device, a mobile computer, a video game system, and/or any other electronic device capable of receiving content from the one or more content providers via one or more wired communication links, wireless communication links, and/or physical distribution systems.

In some embodiments, the content receiver 103 may be associated with an individual, business or other entity, user, or subscriber that receives a content service transmission from the service provider 101. Generally, the terms "user" and/or "subscriber" refer to individuals or companies that receive the content service transmission. This may include individuals or companies that have purchased a subscription to the content service transmission.

In illustrative embodiments, the content receiver 103 may include one or more processing units 113, one or more one or more non-transitory storage media 115, a recorder 117, and a user interface module 119.

In some embodiments, the processing unit 113 of the content receiver 103 may be operable to execute instructions stored in the non-transitory storage medium 115 in connection with various functions associated with the receiver 103. For example, the processing unit 113 may be configured to display graphics, images, videos, animations and/or other multimedia content on an integrated display device or the display device 105. Additionally, the processing unit 113 may be configured to communicate with the recorder 117 to selectively record multimedia content based, at least in part, on: (i) recording settings that may be provided by users of the content receiver 103; and (ii) content data received from the service provider 101. The content data may be locally stored to a memory device of the receiver 103 (e.g., the non-transitory storage media 115) on a periodic or random basis, or may be continuously pulled from its source by the processing unit 113.

The receiver 103 may also include or be associated with a memory or other storage device 115, such as magnetic or optical storage. The storage device 115 may be volatile or non-volatile memory implemented using any suitable technique or technology such as random access memory (RAM), disk storage, flash memory, solid state and/or other suitable storage medium. The storage device 115 may be located within the receiver 103 or separately from the receiver 103.

In some embodiments, the content receiver 103 may include or be associated with a recorder 117, such as a digital video recorder. The recorder 117 may be operated by the processing unit 113 to record particular segments of multimedia content, such as television programs and/or a portions of television programs. When the particular segment occurs, the recorder 117 may record the segment. The recorded content segment may be stored in a database accessible to the processing unit 113, such that it is available for later viewing by a user. In addition to this functionality, the recorder 117 may buffer a certain amount of content during a live transmission. Buffering a live transmission allows a user to pause and/or rewind the content of the transmission and to then display the content in a non-live or delayed manner. While the present disclosure is described with respect to embodiments in which the recorder 117 is provided as a component of the content receiver 103, the recorder 117 may be provided as a stand alone device in communication with the content receiver 103, which has its own processing unit, memory, processing logic, etc.

In various embodiments, the content receiver 103 may include or be associated with a user interface (UI) module 119 configured to allow a user to interact with the processing unit 113 and/or the recorder 117 to, for example, play back recorded content, record content, modify recording settings for content, and/or control other aspects of the content receiver 103. For example, the UI module 119 may be utilized to display a UI on a display device in communication with the content receiver 103 that is navigable by users, and through which users may enter commands to carryout the foregoing functions. As used herein, the term "module" may refer to software computer program logic run on the processing unit 113 and/or any hardware or circuitry utilized to provide the functionality attributed to the module.

In illustrative embodiments, the UI module 119 may be configured to provide a visual representation of at least a portion of the content data to users of the content receiver 103. For example, in embodiments in which the multimedia content includes television programming, the visual representation may be viewable on a display device (e.g., the display device 105) in the form of a grid having programming channels displayed on a first side of the grid and time of day on a second side of the grid. The programs shown on a particular channel may be indicated by name within the grid and the start and stop times of programs may be indicated by indicator lines aligned with times of day. Additionally, or alternatively, the visual representation may include one or more lists of television programs which may be automatically generated by the content receiver 103 (e.g., lists of programs based on category, subcategory, genre, etc.) and/or generated by the content receiver 103 in response a user input (e.g., lists generated in response to user-inputted search criteria). Of course, the foregoing describes only a small number of possibilities for visually representing the content data and there are many possible variants within the scope of the present disclosure.

In some embodiments, via the UI module 119, users may select content to be recorded by the recorder 117. If the content includes television programming that is broadcast on a plurality of programming channels, user selection may include, for example, selecting a program by navigating through a visual representation of the content data and selecting the program. For example, the program may be selected from a program guide, a list of programs, or by some combination or variation of these techniques. Alternatively, or additionally, the program may be selected by specifying that a certain programming channel should be recorded at a certain time, specifying that any program containing a certain word in its title should be recorded, or by some combination or variation of these techniques. Information regarding the content selected for recording may be stored to a database accessible to the processing unit 113, such as the storage device 115. Utilizing at least this information, the processing unit 113 may instruct the recorder 117 to selectively record content transmitted to the content receiver 103 from the service provider 101.

In various embodiments, the UI module 119 may be further configured to allow users of the content receiver 103 to establish and/or modify recording settings for content that is selected for recording. In this regard, the UI module 119 may be configured to automatically prompt users to establish and/or modify recording settings upon selection of content to be recorded, and/or provide an interface through which users can enter a series of commands to establish and/or modify recording settings. The recording settings may be stored to a database (e.g., storage device 115) accessible to the processing unit 113. Generally, recording settings may refer to a set of instructions or rules associated with a particular segment of content selected for recording, which the processing unit 113 may follow when instructing the recorder 117 to record a particular content segment. Recording settings may include, for example, timing aspects of the recording, a priority designation of the recording (e.g., level 1/level 2/level 3, high/medium/low, etc.), frequency of the recording (e.g., whether all episodes of a recurring program should be recorded, only new episodes, only episodes occurring on certain days, etc.), the recording quality level, the number of episodes of a program to maintain in storage, and/or any other settings relevant to the recording of multimedia content.

Timing aspects of the recording may include at least the start time and/or the end time of the recording. In some embodiments, upon user selection of a particular segment of content selected for recording, default start times and/or end times may be established. For example, if the particular segment is a television program, the default start time and end time may be established as the scheduled start time and scheduled end time of the program, respectively, as set forth in the content data. However, as previously discussed, recording of a program in accord with the scheduled start and end time may not provide users with the entire program. Therefore, in various embodiments, the timing aspects of the recording may further include start time and/or end time modification that allows users to specify that a recording should begin a selected time period before the scheduled start time (i.e., start early) and/or should end a selected time period after the scheduled end time (i.e., end late)

Often times, recorders, such as the recorder 117, can record from only a limited number of input signals at a given time. If the multimedia content distributed by the content provider 101 is in the form of television programming provided on a plurality of programming channels, due to this limitation, recorders are only able to record a limited number of programming channels at a given time as well. Such recording limitations may be exacerbated by recording settings such as those described above, which allow for recording to start a selected time period before the scheduled start time and/or end a selected time period after the scheduled end time. For example, consider a user that programs the recorder 117 to record, on the same day, a first program scheduled to broadcast on a first channel between 6:00-7:00 pm, a second program scheduled to broadcast on a second channel between 7:00-8:00 pm, and a third program scheduled to broadcast on a third channel between 7:00-8:00 pm. Assuming that the recorder is configured to record up to two programming channels at a given time, if the default timing settings are employed, the recorder 117 is able to record each of the three programs without conflict. However, if a user instructs the recorder 117 to end the recording of the first program a selected time period after the scheduled end time (i.e., end late), a conflict will occur. That is, the number of program channels scheduled to be recorded at a given time (e.g., 7:01 pm) will exceed the number of programs channels the recorder 117 can record simultaneously and, thus, the second program or the third program cannot be recorded. Such a conflict may be referred to herein as a "start early/end late conflict." Under this hypothetical, an additional start early/end late conflict would occur if, for example, the recording settings of both of the second and third programs were modified to start early.

Now consider that the first and second programs may be recurring programs that broadcast at a certain time of day with some frequency (e.g., television series that broadcast weekly) and the third program is a one-time or randomly broadcasted program (e.g., a sporting event). If a user is provided only an option to start early/end late with respect to every occurrence of a particular recurring program, and the user desires to record each of the first, second, and third programs, the user must choose to cancel the end late setting for every occurrence of the first program. However, if the user is provided an option to selectively or conditionally start early/end late with respect to the occurrences of a recurring program, a user may be allowed to cancel the end late setting for only select occurrences of the first program, such as only those involving a conflict. Therefore, in some embodiments, the recording settings may further allow users to flexibly or conditionally modify the start and stop recording times. Particularly, users may be allowed to provide preferences for conditionally resolving conflicts caused by modification of the default recording start or stop times.

In illustrative embodiments, the preferences for resolving start early/end late conflicts may include an option to always record a selected segment of the recurring content (e.g., all episodes of a television series, new episodes of a television series, episodes of a television series broadcasting on certain days, etc.) with the modified start and/or stop time setting, irrespective of any start early/end late conflicts generated thereby. The preferences may also include an option to record a selected segment of the recurring content with the modified start and/or stop time setting only if no start early/end late conflicts are generated thereby and, thus, to cancel the modified start and/or stop time setting if a start early/end late conflict is generated. Additionally, the preferences may include an option to record with the modified start and/or stop time only if a start early/end late conflict involves programs having a lower priority level. For example, referring to the example above, if either or both of the second and third programs had been assigned a higher priority designation than the first program, the modified stop time of the first program would be cancelled. However, if neither of the second and third programs had been assigned a higher priority designation than the first program, the recording of the first program would be carried out with the modified stop time. Other preferences and/or conditions for resolving start early/end late conflicts may be included, such as preferences and/or conditions based on category designations of the content.

It is to be appreciated that the foregoing preferential or conditional conflict resolution process may require a previously scheduled recordings to be cancelled. The processing units 113 may be configured to, in the event that such cancellation requires selection from among two or more scheduled recordings, determine which recording to cancel randomly, based on priority or category designations associated with the recordings, by a heuristic applied by the processing unit 113, etc. In some embodiments, the processing units 113 may be further configured to record any portion of a cancelled recording that remains after the conflict has passed (e.g., after the modified stop time).

In some embodiments, the display device 105 may be any kind of display device such as a cathode ray tube display, a liquid crystal display, a television, a computer monitor, or other electronic display device.

Figure 2:
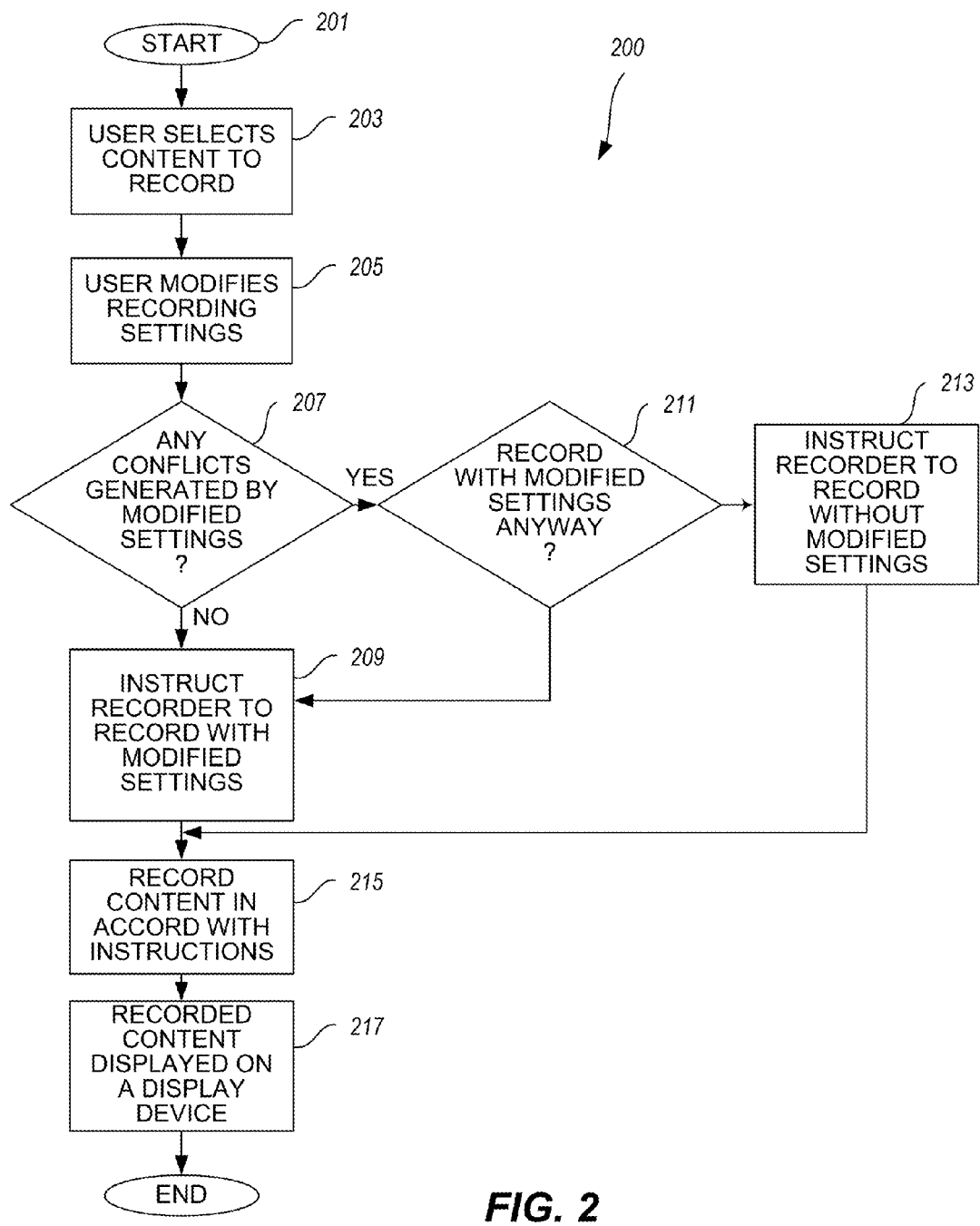
FIG. 2 is a flow chart illustrating a method for recording multimedia content in accordance with some embodiments of the present disclosure. This method may be performed by the system of FIG. 1.

FIG. 2 illustrates a method 200 for facilitating recording of multimedia content utilizing start early and/or end late recording settings in accordance with some embodiments of the present disclosure. The method 200 may be performed by the system 100 of FIG. 1. The flow begins at block 201 and may proceed to block 203 where a user may select one or more segments of multimedia content to be recorded by the recorder 117. In some embodiments, the step of block 202 may include a user selecting a television program by navigating through a programming guide visibly displayed to the user, and selecting the program from the programming guide. Alternatively, any method for selecting a segment of multimedia content may be employed. The selected segment of multimedia content may include a recurring television program, such as a television series.

At block 205, the user may establish recording settings for the multimedia content selected in the step of block 203. For example, users may establish and/or modify the start and/or stop recording times for the multimedia content selected in the step of block 203. Additionally, users may establish and/or modify preferences for resolving any start early/end late conflicts. Other recording settings may be established and/or modified in the step of block 205.

At block 207, the processing unit 113 may query, for each occurrence of the multimedia content selected in the block of 203, whether any recording setting modifications generate start early/end late conflicts with one or more segments of multimedia content that have been previously selected for recording. For example, the processing unit may query whether any start/stop recording time modifications result in the number of program channels scheduled to be recorded at a given time exceeding the number of programs channels the recorder 117 can record simultaneously. If, for an occurrence, the modified recording setting does not generate a conflict, the flow may proceed to block 209, where the processing unit 113 may instruct the recorder 117 to record such occurrence in accordance with the modified start and/or modified stop recording times. If, however, for an occurrence, the modified recording setting does generate a conflict, the flow may proceed to block 211, where the processing unit 113 may query whether to record such occurrence with the modified start and/or modified stop recording setting despite the start early/end late conflict.

The query of block 211 may be answered based, at least in part, on the recording preferences established in the step of block 205. For example, if a preference of recording with modified start and/or modified stop time regardless of conflicts was established in the step of block 205, the query of block 211 may be answered in the affirmative and the flow may proceed to block 209, where the processing unit 113 may instruct the recorder 117 to record the occurrence in accordance with the modified start and/or modified stop recording times. It is to be appreciated that under this scenario, the processing unit would then cancel the recording of one or more of the previously scheduled recordings in order to resolve the conflict. If the cancellation requires selection from among two or more recordings, the determination of which recording to cancel can be made, for example, randomly, or based on priority information associated with the recordings, or by a heuristic applied by the processing unit 113, etc.

If, however, a preference of recording with modified start and/or modified stop time only in the event of no start early/end late conflicts was established in the step of block 205, the query of block 211 may be answered in the negative, and the flow may proceed to block 213. At block 213, the processing unit 113 may instruct the recorder to record the occurrence without the modified recording setting.

Referring again to the query of block 211, alternatively, or additionally, a preference of recording with modified start and/or modified stop time based on priority designations may be established in the step of block 205. For example, a preference of recording with modified start and/or modified stop time only if a priority level of the occurrence is greater than priority levels of the other content involved in the conflict may be established. In such an embodiment, the step of block 211 may include a comparison of a priority level of the occurrence with the priority levels of the content involved in the conflict. Alternatively, or additionally, a preference of recording with modified start and/or modified stop time based on category of the content may be established in the step of block 205. For example, a preference of recording with modified start and/or modified stop time unless the conflict is with respect to content within one or more categories (e.g., sporting event, movie, etc.) may be established. In such an embodiment, the step of block 211 may include evaluating the category designations of the content involved in the conflict.

Following the steps of block 209 and 213, the flow may proceed to block 215, where the recorder 117 records the occurrence in accordance with the instructions received from the processing unit 113 and stores the content to a database. The flow may then proceed to block 217, where responsive to a user command, the recorded content is retrieved from the database and displayed on a display device, such as the display device 105. The flow may then proceed to block 219 and end.

It should be understood that the specific steps as well as the specific order or hierarchy of steps described in method 200 is an example of a sample approach. In other implementations, some of the specific steps as well as the specific order or hierarchy of steps in the method may be rearranged while remaining within the disclosed subject matter.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and/or other suitable storage medium.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A content receiver for recording multimedia content, comprising:
   a processing unit;
   a recorder operatively coupled to the processing unit; and
   a user interface (UI) module coupled to the recorder and to the processing unit,
   wherein the processing unit is provided with computer implemented instructions to:
     receive, via the UI module, a first input from a user selecting a plurality of episodes of a recurring program for recording, wherein each one of the selected episodes is associated with a scheduled start time and a scheduled end time, the first input creating first recording settings;
     receive, via the UI module, a second input from the user for the first recording settings, the second input indicating at least one of a modified start time for recording the selected episodes of the recurring program that is earlier than the scheduled start time and a modified end time for recording the selected episodes of the recurring program that is later than the scheduled end time;
     receive, via the UI module, a third input from the user for the first recording settings, the third input indicating a condition for flexibly recording ones of the selected episodes of the recurring program, less than all of the selected episodes, in the event of a recording conflict;
     compare the at least one of the modified start time and modified end time in the first recording settings with at least one of a start time and end time of a segment of multimedia content to be recorded to determine whether there is a recording conflict, the at least one of the start time and end time of the segment of multimedia content having been stored in the database accessible to the processing unit;
     for each of the selected episodes,
     upon detection of a conflict, determine whether to record the selected episode of the recurring program with the modified start time and/or modified end time; and
     automatically cancel one or more previously scheduled recordings to resolve the conflict when it is determined to record the selected episode of the recurring program with the modified start time and/or modified end time.

2. The content receiver of claim 1, wherein the condition is to always record the selected episodes of the recurring program.

3. The content receiver of claim 1, wherein the condition is to record the selected episodes of the recurring program with the modified start and/or modified stop recording time if such recording does not generate a start early/end late conflict with respect to the segments of the multimedia content to be recorded.

4. The content receiver of claim 1, further comprising a content provider in communication with the processing unit, wherein the content provider transmits the recurring program and information relating to the recurring program to the processing unit.

5. The content receiver of claim 4, wherein the information relating to the recurring program comprises the scheduled start and scheduled stop times of the selected episodes of the recurring program.

6. The content receiver of claim 1, wherein the processing unit is provided with further computer implemented instructions to receive a fourth input for the recording setting from the user, the fourth input indicating a priority level for the selected episodes of the recurring program.

7. The content receiver of claim 6, wherein the at least one condition is to record the selected episodes of the recurring program in the recording conflict situation only if the selected episodes of the recurring program are of a higher priority compared to the segment of multimedia content to be recorded.

8. A method for recording multimedia content, comprising:
   storing, utilizing a processing unit, instructions for first recording settings, to record a first recurring program having a plurality of first selected episodes, each of the selected episodes of the first recurring program being associated with a recording start time and a recording end time;
   providing, utilizing the processing unit, instructions for a second recording setting, to record a second recurring program having a plurality of second selected episodes, each of the selected episodes of the second recurring program having a scheduled start time and a scheduled end time;
   providing, utilizing the processing unit, instructions for the second recording setting, to change at least one of a) the scheduled start time of ones of the selected episodes of the second recurring program to a modified start time that is earlier than the scheduled start time and b) the scheduled end time of ones of the selected episodes of the second recurring program to a modified end time that is later than the scheduled end time;

providing, utilizing the processing unit, a condition in the second recording setting for recording selected episodes of the second recurring program in a recording conflict;

comparing, utilizing the processing unit, the at least one of the modified start time and the modified end time in the second recording settings with at least one of the recording start time and the recording end time in the first recording settings to determine whether there is a recording conflict;

for each of the selected episodes of the second recurring program, upon detection of a conflict, determining whether to record the selected episode with the modified start time and/or the modified end time; and automatically cancelling a previously scheduled recording to resolve the conflict when it is determined to record the selected episode of the recurring program with the modified start time and/or modified end time.

9. The method of claim 8, wherein the condition comprises a preference to always record the selected episodes of the second recurring program with the modified start and/or modified stop recording time.

10. The method of claim 8, wherein the condition comprises a preference to record the selected episodes of the second recurring program with the modified start and/or modified stop recording time only if recording such episodes does not generate a start early/end late conflict with respect to episodes of the first recurring program to be recorded.

11. The method of claim 8, further comprising:
receiving the second recurring program and information relating to the second recurring program at the processing unit.

12. The method of claim 11, wherein the information relating to the second recurring program comprises the scheduled start and scheduled stop times of the selected episodes of the second recurring program.

13. The method of claim 8, wherein the instructions are received from a user, and wherein the condition is received from the user.

14. The method of claim 12, further comprising recording the second recurring program in accordance with the condition.

* * * * *

UNITED STATES PATENT AND TRADEMARK OFFICE
CERTIFICATE OF CORRECTION

PATENT NO. : 8,983,274 B2  
APPLICATION NO. : 13/112789  
DATED : March 17, 2015  
INVENTOR(S) : Michael Alexander Page 1 of 1

It is certified that error appears in the above-identified patent and that said Letters Patent is hereby corrected as shown below:

On The Title Page:

Item (54):

"SYSTEMS AND METHODS FOR REVOLVING RECORDING CONFLICTS" should read,
--SYSTEMS AND METHODS FOR RESOLVING RECORDING CONFLICTS--.

Signed and Sealed this
Third Day of May, 2016

Michelle K. Lee
*Director of the United States Patent and Trademark Office*